Jan. 4, 1938.　　　W. S. CLARKSON　　　2,104,010
LIQUID WEIGHT METER
Filed Dec. 26, 1935　　　3 Sheets-Sheet 1

INVENTOR
William S. Clarkson
BY
ATTORNEYS

Jan. 4, 1938.	W. S. CLARKSON	2,104,010
LIQUID WEIGHT METER
Filed Dec. 26, 1935	3 Sheets-Sheet 3

INVENTOR
William S. Clarkson
BY
ATTORNEYS

Patented Jan. 4, 1938

2,104,010

UNITED STATES PATENT OFFICE 2,104,010

LIQUID WEIGHT METER

William S. Clarkson, Ann Arbor, Mich.

Application December 26, 1935, Serial No. 56,128

12 Claims. (Cl. 249—26)

The present invention relates to liquid measuring apparatuses designed to measure various kinds of liquids by weight. It discloses improvements in some respects on the apparatus disclosed in my co-pending application Serial No. 20,528, filed May 9, 1935.

The primary object of the present invention is to provide an automatic liquid weighing apparatus adapted to receive liquid under pressure and after weighing it to discharge it under pressure. In other words the present apparatus constitutes a pressure flow meter and it includes mechanisms which function whereby the pressure on the liquid in the supply line is transmitted to the liquid in the exhaust line so that the liquid being discharged is under pressure substantially the same as that in the supply line.

The present apparatus includes two liquid receiving vessels which are supported in counterpoise relation by a mechanism which so functions when the weight of liquid in one container exceeds the weight of liquid in the other container by a predetermined amount as to disconnect the heavier container from the supply port and to connect it with an exhaust port, and to simultaneously disconnect the lighter container from an exhaust port and to connect it with a supply port. Another object of the invention is to provide a mechanism in which the succession of such reversals of connections takes place automatically as long as liquid is supplied to the mechanism.

A further object of the invention is to provide a mechanism for supporting the vessels in the manner referred to above wherein such mechanism governs the speed of flow of the liquid whereby the liquid entering and leaving the vessels moves at a comparatively slow velocity at the time the measuring movement of the mechanism is about to take place.

Still another object of the present invention is to provide a mechanism which functions in combination with the above referred to vessels for transmitting the pressure from the liquid being supplied to one vessel to the liquid in the emptying vessel whereby the liquid is discharged from the emptying vessel under a pressure substantially corresponding to the pressure of the entering liquid. In accordance with the present invention the said mechanism is constructed and arranged whereby it has no effect on the accuracy of the measurements.

With the above and other ends in view the invention is more fully disclosed with reference to the accompanying drawings in which—

Like characters of reference are employed throughout to designate corresponding parts.

Figure 1:
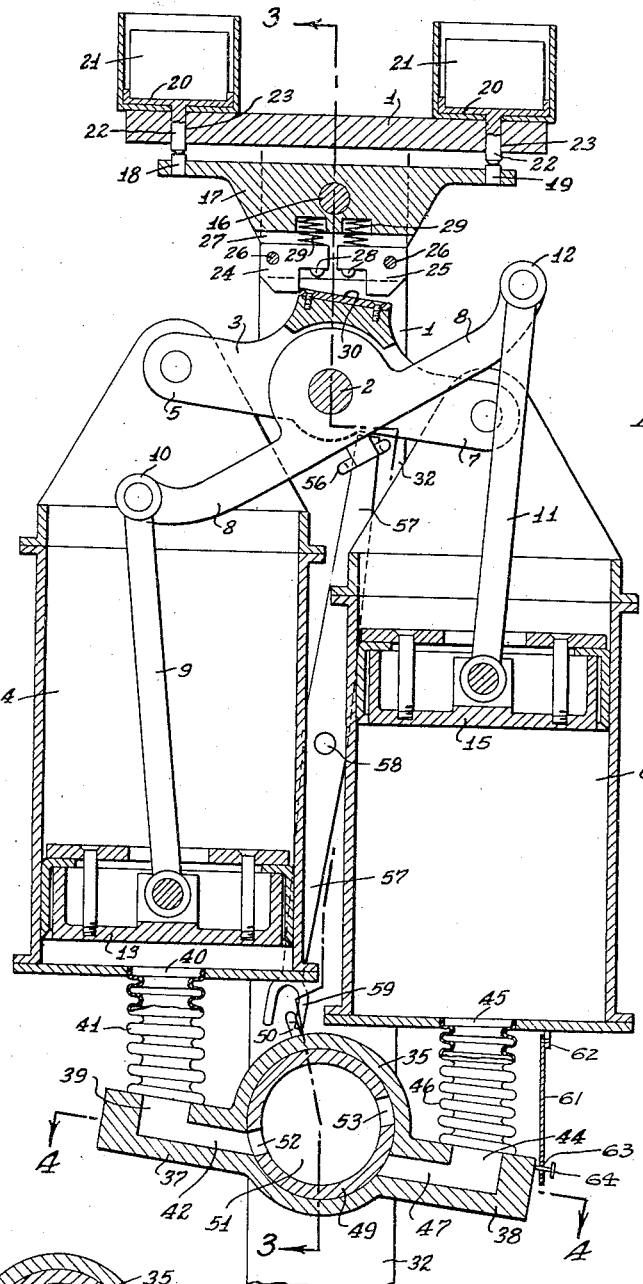
Figure 1 is a vertical section taken on the line 1—1 of Fig. 3.
Figures 3, 4:
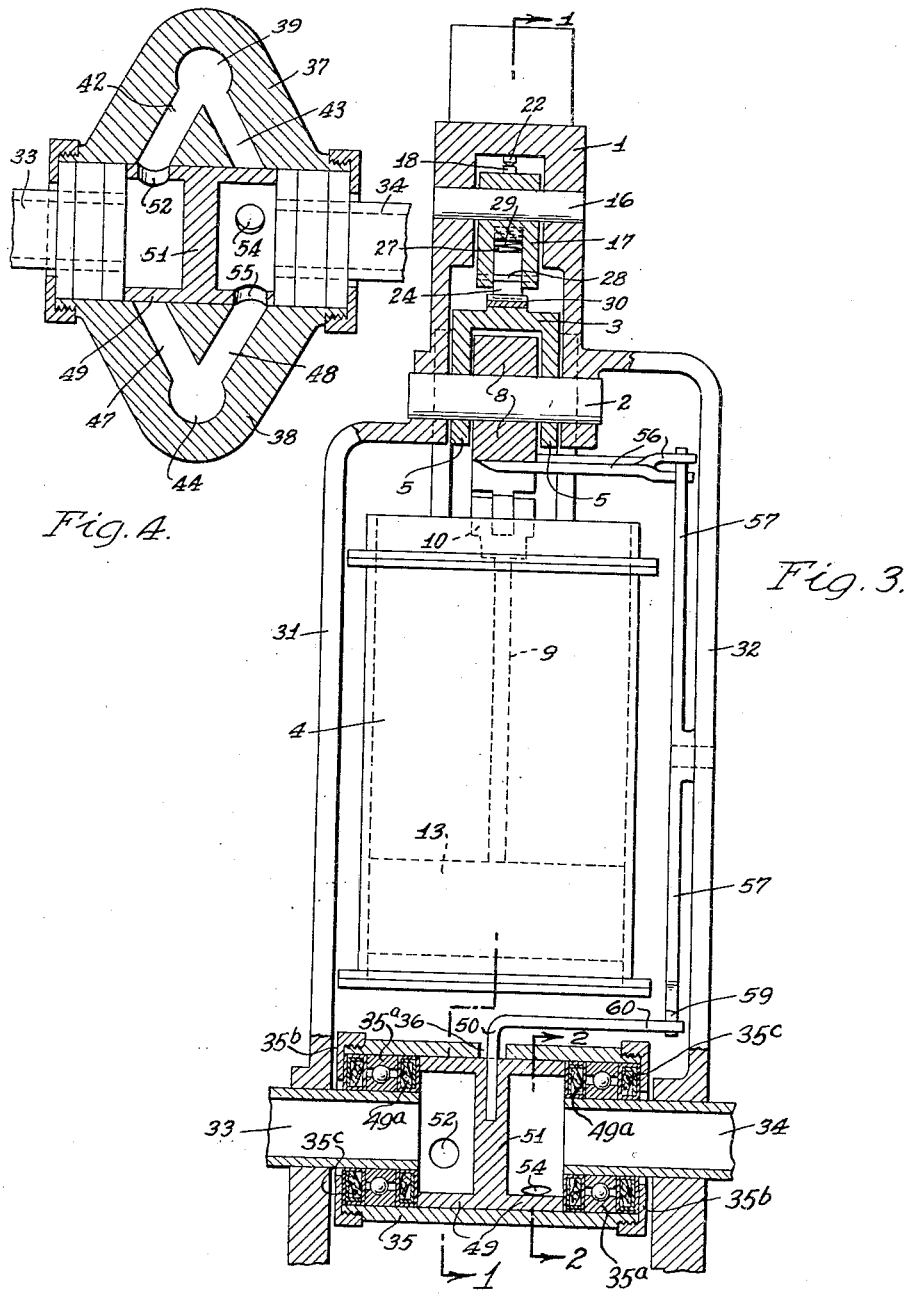
Fig. 3 is a section taken on the line 3—3 of Fig. 1.
Fig. 4 is a section taken on the line 4—4 of Fig. 1.

In Figs. 1 and 3, the numeral 1 designates a bracket of inverted U-shape having bearings supporting a pivot pin 2. Mounted to rock upon the pivot pin 2 is a beam 3, a vessel 4 being pivotally suspended from the arms 5 of the beam at one side of its fulcrum and a vessel 6 being pivotally suspended from the arms 7 of the beam on the other side of its fulcrum. A rocking lever 8 is also fulcrumed intermediate its ends on the pivot pin 2 and has a connecting rod 9 connected to the end 10 thereof and a connecting rod 11 connected to the opposite end 12. The connecting rods 9 and 11 extend into respective vessels 4 and 6 and have pistons 13 and 15 on the lower ends thereof respectively. The pistons 13 and 15 are adapted to be reciprocated in the vessels 4 and 6 in a manner to be presently described.

Also mounted in the supporting bracket 1 is a pivot pin 16 rockably supporting a latch lever 17, the latch lever having pins 18 and 19 mounted in opposite ends thereof respectively. Supported by the bracket 1 above each of the pins 18 and 19 is a weight pan 20 carrying a weight 21 and having a pin 22 extending downwardly through a bore 23 in the bracket 1 and adapted to be engaged by respective pins 18 and 19. The latch lever 17 carries two pawls 24 and 25 which are pivoted on the pins 26 in the groove 27 therein. Adjacent each pawl is provided a stop pin 28 which functions to positively restrict clockwise pivotal movement of the pawl 24 and to restrict counterclockwise movement of the pawl 25. Springs 29 are mounted in the latch lever 17 to press against the pawls 24 and 25 to maintain them in engagement with their respective stop pins 28, the springs being adapted to yield to permit counterclockwise pivotal movement of the pawl 24 and clockwise movement of the pawl 25 when pressure is exerted against the pawls in a manner to be hereinafter described. On top of the beam 3 is mounted a removable wear plate 30 preferably formed of hard metal.

The bracket 1 is supported by frame members 31 and 32 which extend downwardly therefrom to the valve casing beneath the vessels 4 and 6. Rigidly supported in the frame members 31 and 32 respectively, are hollow shafts 33 and 34, the shafts being disposed in a plane beneath the bottoms of the vessels 4 and 6. Rotatably journaled on the shafts 33 and 34 by two anti-friction bearings 35a is a sleeve 35 formed with a parti-circumferential slot intermediate its ends and with arms 37 and 38 extending outwardly on opposite sides thereof. The sleeve 35 is closed at its opposite ends by caps 35b, having axial openings through which the shafts 33 and 34, respectively, extend, there being sealing elements 35c interposed between each bearing 35a and the cap at its respective end of the sleeve 35. The arm 37 has a port 39 which is connected to a port 40 in the bottom of the vessel 4 by a flexible conduit 41 commonly known as a sylphon bellows. Such tubes are elastic, as well as flexible, inasmuch as they are capable of being extended or contracted. A passage 42 extends from the port 39 and opens through the inner surface of the sleeve 35 to one side of the center thereof and a second passage 43 extends from the port 39 through the inner surface of the sleeve 35 at a point located on the other side of the center thereof, (with respect to the ends of the sleeve), and therefore spaced from the passage 42. The arm 38 has a port 44 which is connected to a port 45 in the bottom of the vessel 6 by a flexible conduit 46 identical to the conduit 41. Two passages 47 and 48 diverge from the port 44 and open through the inner periphery of the sleeve 35 on opposite sides of the center of the sleeve. Rotatably received in the sleeve 35 is a valve cylinder 49 having an actuating arm 50 extending through the slot 36 in the sleeve 35 and also having a partition 51 intermediate its ends. A seal 49a is provided between the ends of the cylinder 49 and the adjacent bearings 35a. The valve cylinder 49 has two ports 52 and 53 located on one side of the partition and ports 54 and 55 located on the other side of the partition. When relative rotation takes place between the sleeve 35 and the valve cylinder 49, the ports 52 and 53 are adapted to be moved into or out of register with the passages 42 and 47 respectively, and simultaneously the ports 54 and 55 are adapted to be moved into or out of register with the passages 43 and 48. Extending laterally from the rocking lever 8 is a yoke 56 adapted to engage the upper end of a lever 57 which is pivoted at 58 to the frame member 32. The lower end of the lever 57 has a yoke 59 adapted to engage the bent end 60 of the arm 50.

Figure 2:
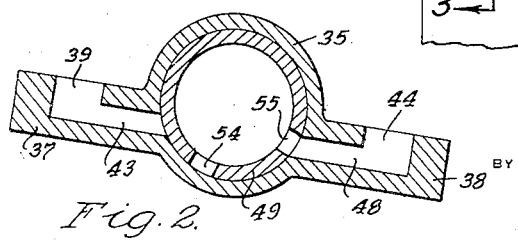
Fig. 2 is a section taken on the line 2—2 of Fig. 3.

In order that the operation of the present apparatus may be understood it will be assumed that the hollow shaft 33 is connected to means for supplying liquid under pressure in which case the hollow shaft 34 will be the outlet from the present mechanism. Assuming that liquid is entering the shaft 33 under pressure and that the parts are in the position shown in Fig. 1, the liquid will flow through the port 52, passage 42, port 39, flexible conduit 41 and port 40 to the vessel 4 and at the same time, referring to Figs. 1 and 2, it will be seen that the liquid leaves the vessel 6 through the port 45, the flexible tube 46, the port 44, the passage 48 and port 55. As the liquid enters the vessel 4 it forces the piston 13 upwardly, causing the rocking lever 8 to oscillate and force the piston 15 downwardly in the vessel 6. It becomes obvious therefore that the liquid is discharged from the vessel 6 at the same rate that it is supplied to the vessel 4.

Figure 5:
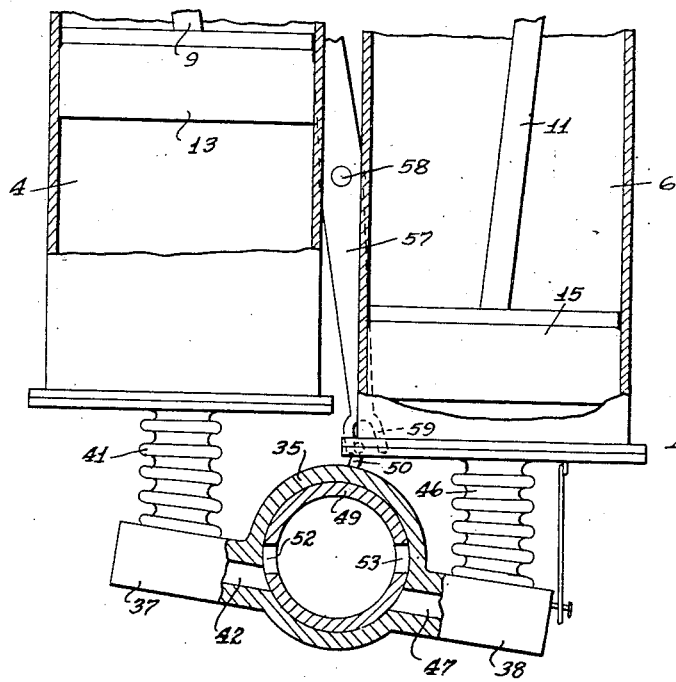
Fig. 5 is a view partly in section illustrating another position of the parts.
Figure 6:
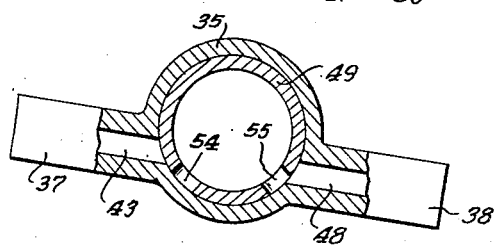
Fig. 6 is a section corresponding to Fig. 2 with the parts positioned to correspond to Fig. 5.
Figure 7:
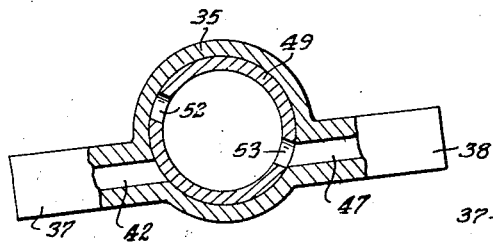
Figs. 7 and 8 are sections of the valve taken in planes corresponding to Figs. 1 and 2 respectively, and illustrating a different stage in the operation.
Figure 8:
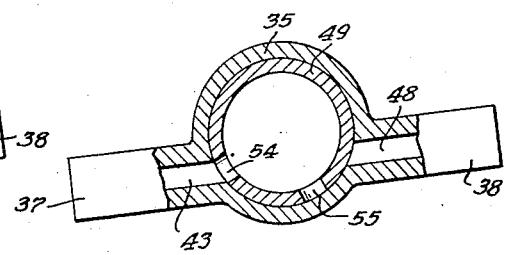

As the rocking lever 8 oscillates the yoke 56 moves therewith and carries the upper end of the lever 57 therewith, thereby causing the yoke 59 to engage the end 60 of the arm 50 to rotate the valve cylinder 49 with respect to the sleeve 35. As the piston 13 approaches the upper limit of its movement the yoke 59 will have engaged the arm end 60 and will have moved the valve cylinder 49 to a position which is shown in Figs. 5 and 6, it being understood that these figures are sections taken on opposite sides of the central partition in the valve cylinder. In the position shown in Figs. 5 and 6 the port 52 only partially registers with the passage 42 and the port 53 is still out of register with the passage 47. Similarly the port 55 partially registers with the passage 48 and the port 54 is out of register with the passage 43. It becomes obvious therefore that the rate of flow of the liquid is automatically greatly reduced at this stage in the operation and the weight action therefore becomes very sensitive.

As the vessel 4 is thus filled with liquid and the liquid is discharged from the container 6 it becomes apparent that a weight differential is present which tends to bias rocking movement of the beam 3, that is to say, if it is assumed that the vessel 4 is now almost filled with liquid and the vessel 6 is almost empty the tendency is for the vessel 4 to pull the arms 5 downwardly. Such a tendency is prevented by engagement of the plate 30 with the pawl 24 until such time as the weight bias of the vessel 4 is sufficient to rock the latch lever 17 against the opposition imposed against such movement by the weight 21 acting through the pin 22 on the pin 18 carried by the latch lever. When this weight difference exists the latch lever 17 is rocked and the plate 30 clicks past the pawl 25 and the parts are thus positioned for the next cycle of operation.

When the beam 3 oscillates the vessels 4 and 6 move relatively and rock the arms 37 and 38 and cause rotation of the sleeve 35. During a fraction of the movement of the sleeve 35 the yoke 59 holds the arm end 60 stationary with the result that the sleeve moves relative to the valve cylinder 49. This relative movement between the sleeve and valve cylinder causes the port 52 to be moved completely out of register with the passage 42 and the port 53 to be moved into register with the passage 47 and at the same time on the opposite side of the partition 51 to cause the port 54 to be moved into register with the passage 43 and the port 55 to be moved out of register with the passage 48. Liquid is then supplied to the vessel 6 and withdrawn from the vessel 4 and the beam 3 and rocking lever 8 are again rocked to reverse the order of connections of the above described ports and passages when the weight of liquid in the container 6 overbalances that in the container 4 to such an extent that the latch lever 17 is rocked against the opposition imposed thereon by engagement of the weight supporting pin 22 with the pin 19.

In describing the operation as above, it was assumed that the flexible tubes 41 and 46 would move the sleeve 35 with the vessels. Due to the fact that these tubes are more or less elastic and that a small amount of friction is present which opposes movement of the sleeve 35, the movement of the sleeve 35 lags slightly behind the movement of the vessels. This feature is important in the operation of the present invention because the friction of the valve means does not oppose movement of the vessels, at the time the latch lever clicks past its movement opposing weight. In Fig. 1, however, it will be seen that the invention provides a lost motion connection between one of the vessels and an arm on the sleeve 35. This connection comprises a link 61 which is pivotally attached at one end to the vessel 6 as indicated at 62. The link 61 has a slot 63 through which a headed pin 64, on the extremity of the arm 38, projects. This means permits the tubes 41 and 46 to be of highly elastic nature so that in stretching or compressing they offer no appreciable resistance to movement of the vessels 4 and 6. When movement of the vessels takes place, the sleeve 35 remains stationary until such time as the plate 30 clicks past whichever pawl 24—25 happens to be opposing its movement, so that no pressure is required to move the valve means until after the measurement has been completed.

The invention contemplates the use of a conventional counting mechanism for indicating the number of movements of the beam supporting the vessels, but inasmuch as such counting mechanisms are already known in the art the same has not been illustrated here.

Although a specific embodiment of the invention has been illustrated and described it will be understood that various changes may be made within the scope of the appended claims and such changes are contemplated.

What I claim is:—

1. In combination, a pair of liquid receiving vessels, oscillating means supporting said vessels in counterpoise relation, valve means for supplying liquid to and for emptying it from said vessels alternately, means for inhibiting movement of said oscillating means whereby to define a predetermined weight difference between said vessels at the time movement thereof takes place, automatic means for regulating said valve means to reduce the velocity of liquid entering and leaving said vessels immediately prior to the filling and emptying of said vessels to a degree attaining said predetermined weight difference, and means independent of said automatic means and actuated subsequently to actuation of said automatic means by movement of said vessels for shifting the valve means.

2. In combination, a pair of liquid receiving vessels, oscillating means supporting said vessels in counterpoise relation, valve means for supplying liquid to and for emptying it from said vessels alternately, means for inhibiting movement of said oscillating means whereby to define a predetermined weight diference between said vessels at the time movement thereof takes place, automatic means for regulating said valve means to reduce the velocity of liquid entering and leaving said vessels immediately prior to the filling and emptying of said vessels to a degree attaining said predetermined weight difference, and means actuated by movement of said vessels for shifting the valve means, said last named means including a lost motion connection whereby movement of said vessels is initiated prior to the initiation of movement of said valve means.

3. In combination, a pair of liquid receiving vessels, oscillating means supporting said vessels in counterpoise relation, valve means for supplying liquid to and for emptying it from said vessels alternately, means for inhibiting movement of said oscillating means whereby to define a predetermined weight difference between said vessels at the time movement thereof takes place, automatic means for regulating said valve means to reduce the velocity of liquid entering and leaving said vessels immediately prior to the filling and emptying of said vessels to a degree attaining said predetermined weight difference, means independent of said automatic means and actuated subsequently to the actuation of said automatic means by movement of said vessels for shifting said valve means, and means for transmitting pressure from liquid entering a vessel to the liquid in the other vessel.

4. In combination with a liquid measuring apparatus comprising a pair of vessels, means including valves for filling said vessels with liquid and for emptying liquid therefrom, means supporting said vessels in counterpoise relation whereby they move relatively when a weight difference is present between the two vessels, said supporting means being connected to said valves whereby movement thereof actuates said valves to reverse the order of filling and emptying, and automatic means operating said valves for regulating the rate of filling and emptying of said vessels to reduce the liquid velocity just prior to the establishment of said predetermined weight difference, and means responsive to the changing liquid levels in said vessels for actuating said last named means.

5. In combination with a liquid measuring apparatus comprising a pair of vessels, means for filling said vessels with liquid and for emptying liquid therefrom, means supporting said vessels in counterpoise relation whereby they move relatively when a weight difference is present between the two vessels to reverse the order of filling and emptying, means for regulating the rate of filling and emptying of said vessels to reduce the liquid velocity just prior to the establishment of said predetermined weight difference, and means for transmitting pressure from the liquid filling a vessel to the liquid in the other vessel, and means connecting said regulating means with said last named means for actuation thereby.

6. In combination, a pair of vessels for measuring liquid, alternating means for supplying liquid to and for exhausting liquid from said vessels, means for actuating said alternating means when the amount of liquid in one container exceeds that in the other by a predetermined amount, means in said vessels movable in response to liquid pressure therein and movable to place pressure on liquid therein, a movable element connecting said last named means whereby the pressure on liquid entering a vessel and acting upon the means therein is transmitted to the means in the other vessel, and control means for said alternating means actuated by movement of said movable element to regulate the velocity of the flow of liquid.

7. In combination, a pair of vessels for measuring liquid, a pivoted beam supporting said vessels in counterpoise relation, means for supplying liquid to and for exhausting liquid from said vessels, means operated by movement of said vessels for alternating the order of liquid supply and exhaust with respect to said vessels, a piston head slidably mounted in each vessel, a rocker arm pivoted co-axially with said beam and having its opposite ends connected to pistons in respective vessels, and means operated by movement of said rocker arm for controlling said liquid supply and exhaust means to cause a reduction in the velocity of liquid supplied to and exhausted from said vessels.

8. In combination, a pair of vessels for measuring liquid, a pivoted beam, said vessels being pivotally suspended by said beam and supported thereby in counterpoise relation, a rocking element pivotally mounted beneath said vessels and having passages therein, flexible conduits connected to respective passages and vessels, valve means mounted in the pivot of said rocking element, liquid supply and liquid exhaust means connected to said valve means, said valve means being operable upon rocking movement of said rocking element to alternately supply liquid to and exhaust it from said vessels through said passages and flexible conduits, means for inhibiting movement of said pivoted beam whereby movement thereof and of said vessels takes place when the weight of liquid in one vessel exceeds that in the other by a predetermined amount, and means connecting a vessel with said rocking element to cause movement thereof incident to movement of said vessels.

9. In combination, a pair of vessels for measuring liquid, a pivoted beam, said vessels being pivotally suspended by said beam and supported thereby in counterpoise relation, a rocking element pivotally mounted beneath said vessels and having passages therein, flexible conduits connected to respective passages and vessels, valve means mounted in the pivot of said rocking element, liquid supply and liquid exhaust means connected to said valve means, said valve means being operable upon rocking movement of said rocking element to alternately supply liquid to and exhaust it from said vessels through said passages and flexible conduits, means for inhibiting movement of said pivoted beam whereby movement thereof and of said vessels takes place when the weight of liquid in one vessel exceeds that in the other by a predetermined amount, and means connecting a vessel with said rocking element to cause movement thereof incident to movement of said vessels, said last named means including a lost motion device whereby a predetermined movement of said vessels takes place prior to movement of said rocking element.

10. In combination, a pair of vessels for measuring liquid, a pivoted beam, said vessels being pivotally suspended by said beam and supported thereby in counterpoise relation, a rocking element pivotally mounted beneath said vessels and having passages therein, flexible conduits connected to respective passages and vessels, valve means mounted in the pivot of said rocking element, liquid supply and liquid exhaust means connected to said valve means, said valve means being operable upon rocking movement of said rocking element to alternately supply liquid to and exhaust it from said vessels through said passages and flexible conduits, means for inhibiting movement of said pivoted beam whereby movement thereof and of said vessels takes place when the weight of liquid in one vessel exceeds that in the other by a predetermined amount, means connecting a vessel with said rocking element to cause movement thereof incident to movement of said vessels, and means operated by the liquid in a filling vessel for moving said valve means prior to the movement of said rocking element for actuating said valve means to reduce the velocity of the liquid entering and leaving said vessels.

11. In combination, a pair of vessels for measuring liquid, a pivoted beam, said vessels being pivotally suspended by said beam and supported thereby in counterpoise relation, a rocking element pivotally mounted beneath said vessels and having passages therein, flexible conduits connected to respective passages and vessels, valve means mounted in the pivot of said rocking element, liquid supply and liquid exhaust means connected to said valve means, said valve means being operable upon rocking movement of said rocking element to alternately supply liquid to and exhaust it from said vessels through said passages and flexible conduits, means for inhibiting movement of said pivoted beam whereby movement thereof and of said vessels takes place when the weight of liquid in one vessel exceeds that in the other by a predetermined amount, means connecting a vessel with said rocking element to cause movement thereof incident to movement of said vessels, and means in said vessels interconnected whereby the pressure on liquid entering a vessel is transmitted to the liquid leaving the other vessel.

12. In combination, a pair of vessels for measuring liquid, a pivoted beam, said vessels being pivotally suspended by said beam and supported thereby in counterpoise relation, a rocking element pivotally mounted beneath said vessels and having passages therein, flexible conduits connected to respective passages and vessels, valve means mounted in the pivot of said rocking element, liquid supply and liquid exhaust means connected to said valve means, said valve means being operable upon rocking movement of said rocking element to alternately supply liquid to and exhaust it from said vessels through said passages and flexible conduits, means for inhibiting movement of said pivoted beam whereby movement thereof and of said vessels takes place when the weight of liquid in one vessel exceeds that in the other by a predetermined amount, means connecting a vessel with said rocking element to cause movement thereof incident to movement of said vessels, means in said vessels interconnected whereby the pressure on liquid entering a vessel is transmitted to the liquid leaving the other vessel, and means actuated by said last named means operating said valve means at a stage in the cycle of operation prior to movement of said rocking element for causing a reduction in the velocity of liquid entering and leaving said vessels.

WILLIAM S. CLARKSON.